J. H. MacMICHAEL.
METHOD OF AND APPARATUS FOR MIXING AND DELIVERING CONCRETE.
APPLICATION FILED JAN. 22, 1912. RENEWED MAR. 12, 1915.
1,250,918.
Patented Dec. 18, 1917.
6 SHEETS—SHEET 1.
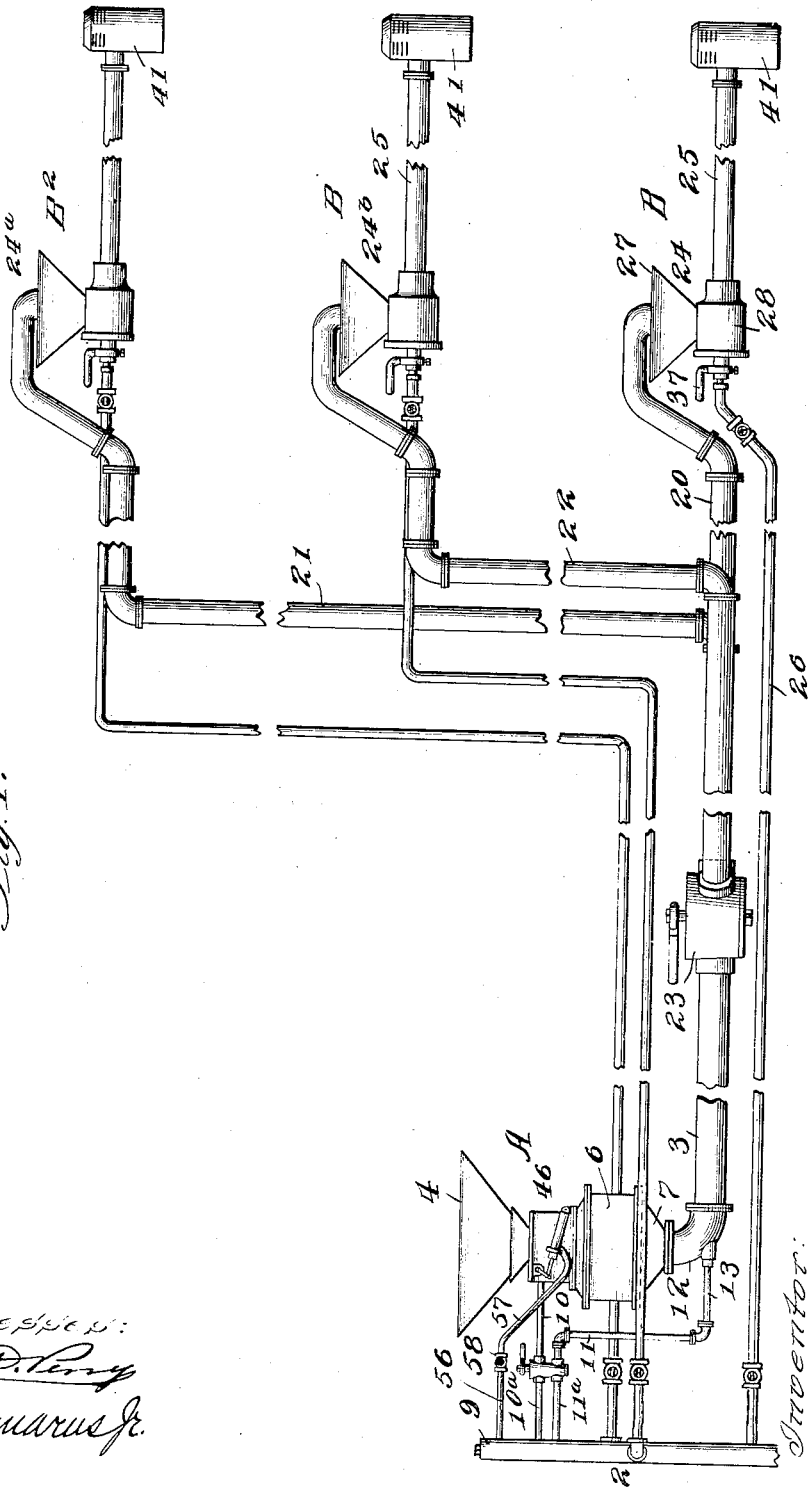

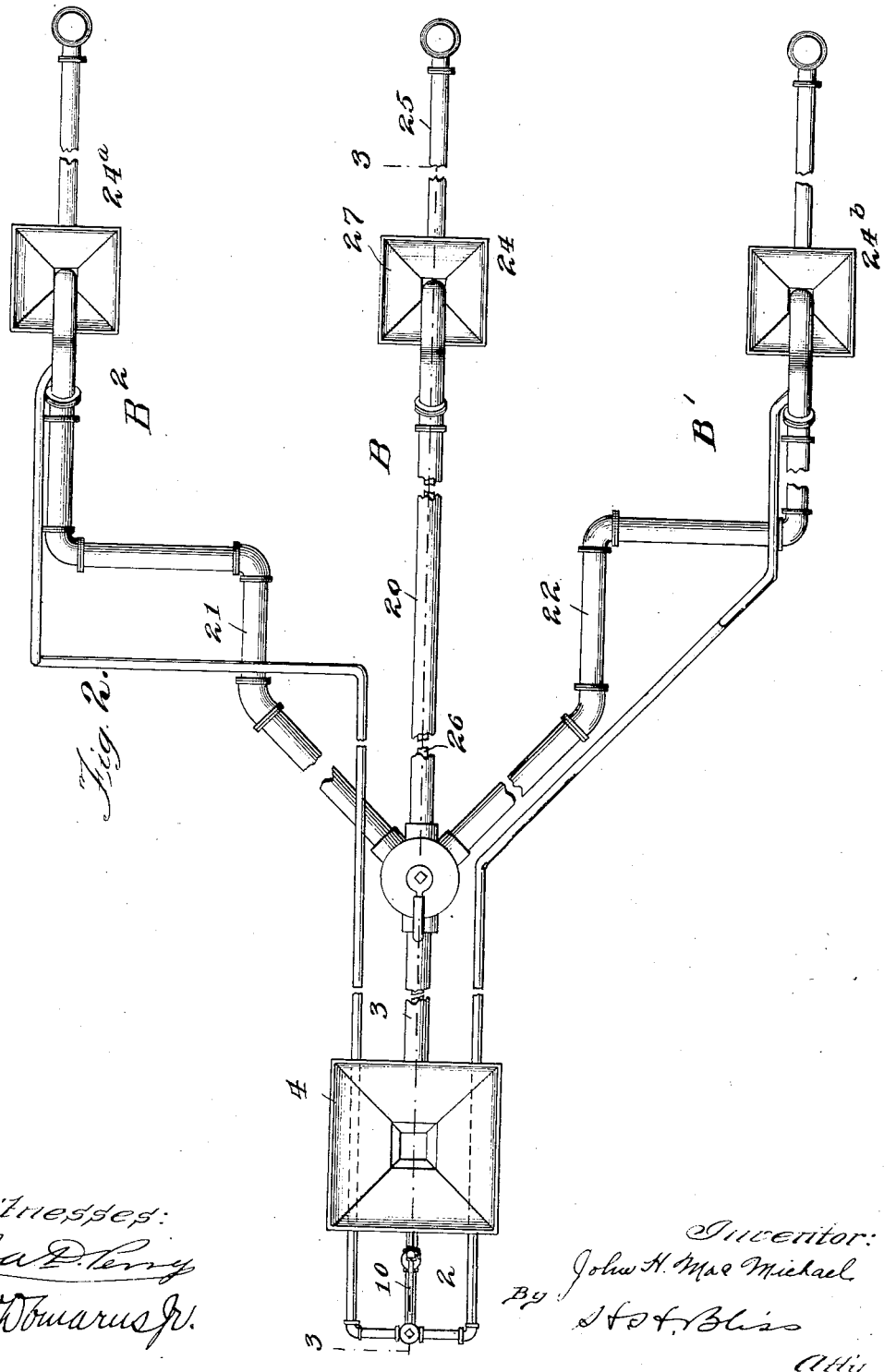

J. H. MacMICHAEL.
METHOD OF AND APPARATUS FOR MIXING AND DELIVERING CONCRETE.
APPLICATION FILED JAN. 22, 1912. RENEWED MAR. 12, 1915.
1,250,918.
Patented Dec. 18, 1917.
6 SHEETS—SHEET 3.
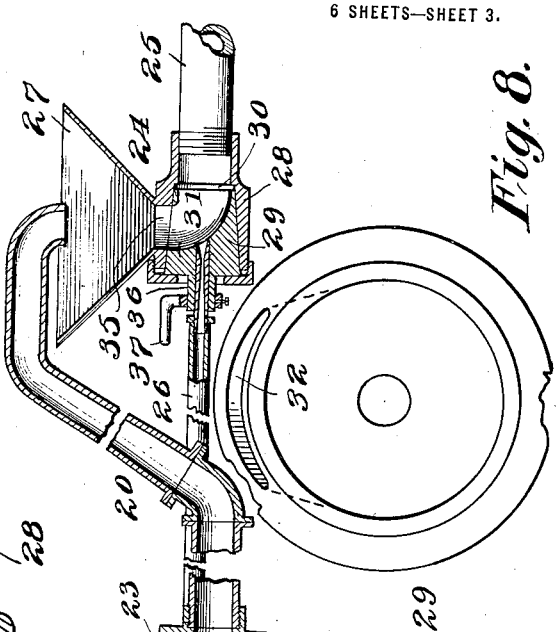
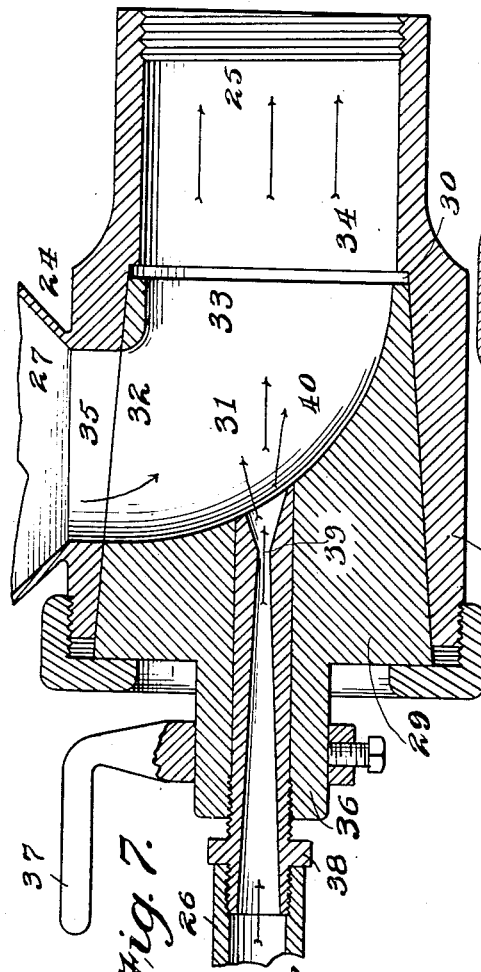
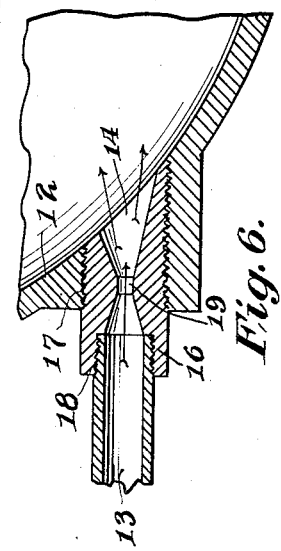
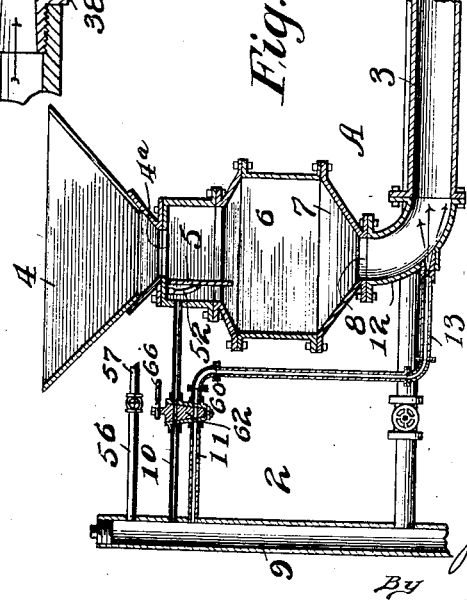
Witnesses:
Inventor:
John H. MacMichael
By
Atty.

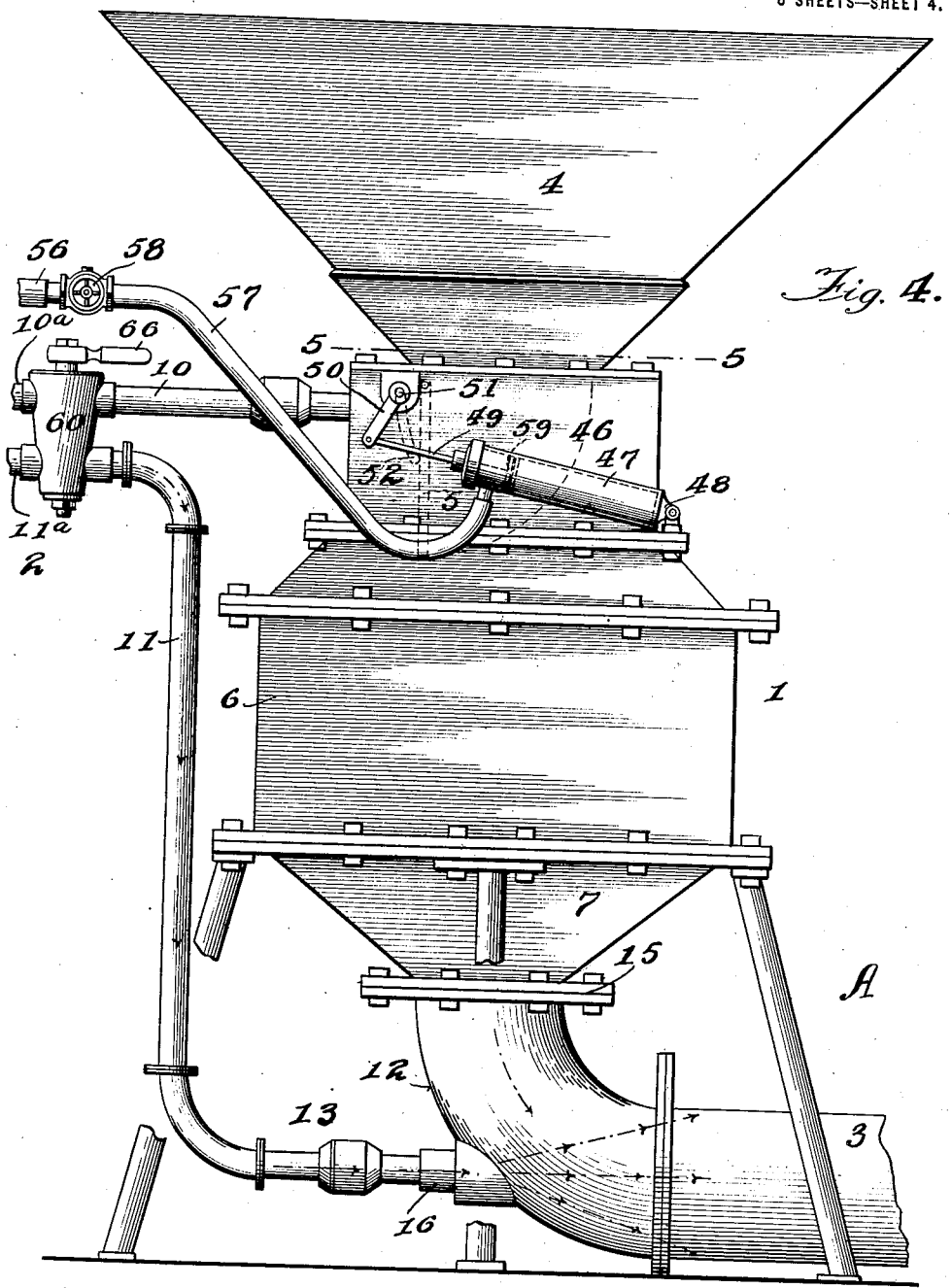

J. H. MacMICHAEL.
METHOD OF AND APPARATUS FOR MIXING AND DELIVERING CONCRETE.
APPLICATION FILED JAN. 22, 1912. RENEWED MAR. 12, 1915.
1,250,918.
Patented Dec. 18, 1917.
6 SHEETS—SHEET 5.
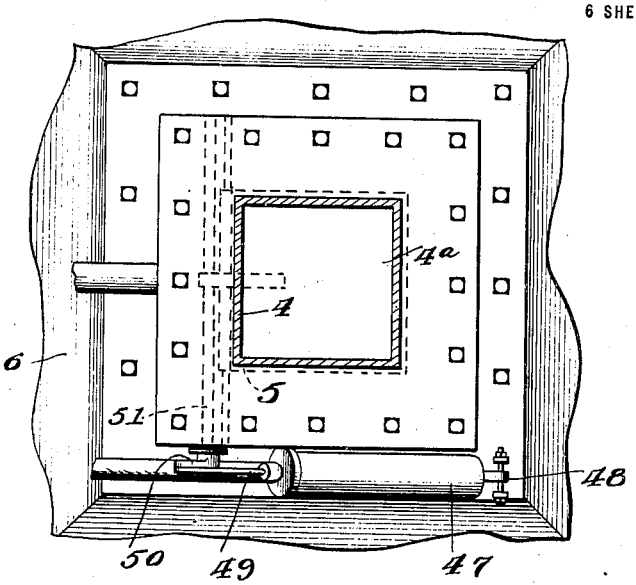
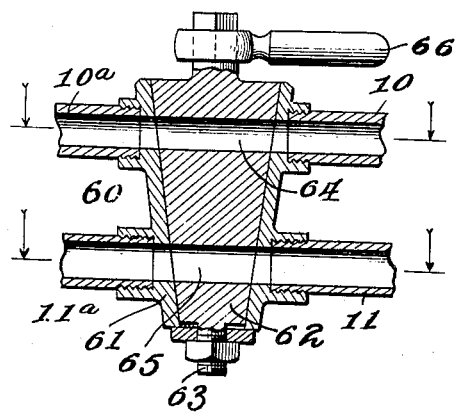
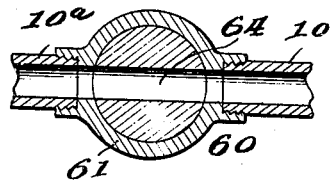
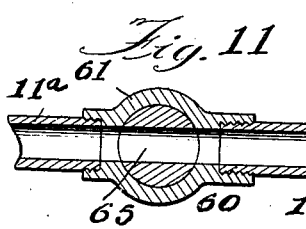
Witnesses:
Inventor:
John H. MacMichael
By H. H. Bliss
Atty.

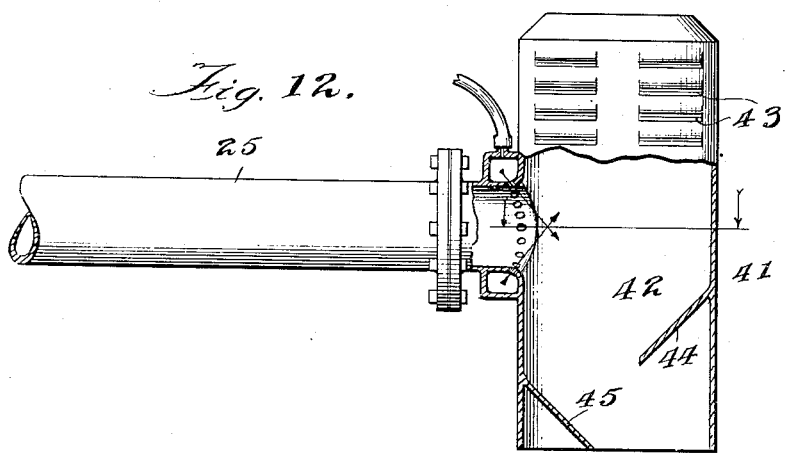
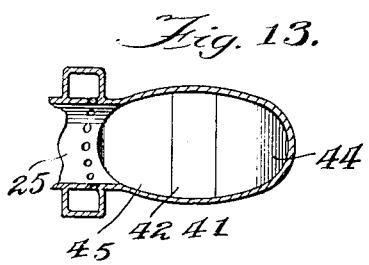
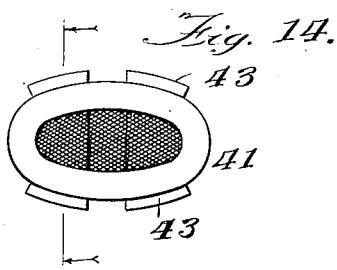
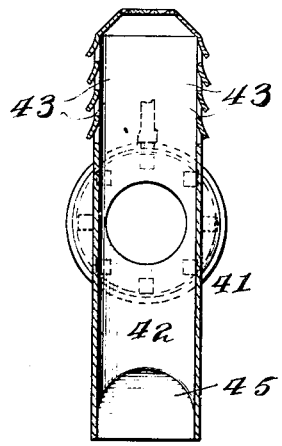

UNITED STATES PATENT OFFICE.

JOHN H. MacMICHAEL, OF TOLEDO, OHIO, ASSIGNOR TO CONCRETE MIXING & CONVEYING COMPANY, A CORPORATION OF ILLINOIS.

METHOD OF AND APPARATUS FOR MIXING AND DELIVERING CONCRETE.

1,250,918. Specification of Letters Patent. Patented Dec. 18, 1917.

Application filed January 22, 1912, Serial No. 672,525. Renewed March 12, 1915. Serial No. 13,968.

*To all whom it may concern:*

Be it known that I, JOHN H. MACMICHAEL, citizen of the United States, residing at Toledo, in the county of Lucas and State of Ohio, have invented certain new and useful Improvements in Methods of and Apparatus for Mixing and Delivering Concrete, of which the following is a specification, reference being had therein to the accompanying drawing.

In the drawings I have shown an apparatus embodying matters of improvements adapted not only for carrying out the entire process, but also for performing each of the series of steps from first to last in the treatment to which the material is subjected.

One of the objects of my invention is to provide an improved method for the mixing and delivering of concrete, the method comprising not only the steps of mixing the concrete materials, but also the steps of conveying the mixed concrete by successive stages to points of use and there depositing it in a satisfactory manner. My improved method also includes an improvement in the initial step of mixing the concrete materials and in initially impelling the mixed concrete. Another object of the invention is to provide an improved apparatus adapted for carrying out the improved method.

In the accompanying drawings I have shown the form of apparatus which I now prefer, but it will be understood that changes and modifications may be made within the scope of the appended claims without departing from the spirit of my invention.

Of the drawings,—

Figure 1 indicates (more or less conventionally) the essential parts of an entire plant.

Fig. 2 is a top plan view.

Fig. 3 is a vertical section on the line 3—3 of Fig. 2.

Fig. 4 is a side elevation on an enlarged scale of the devices used at the places where the initial component materials are brought together, where the mixing is commenced and where the material is acted upon to initially propel it.

Fig. 5 is a horizontal section on the line 5—5 on Fig. 4.

Fig. 6 is a partial vertical section through the velocity nozzle at the lower end of the initial receptacle, and at the receiving end of the mixing and delivering duct.

Fig. 7 is a vertical central section of the devices at the receiving end of one of the distributing elements of the apparatus together with the means for controlling the supply of material and supplying the air blast at this point.

Fig. 8 is an end view of the controller or valve in Fig. 7.

Figs. 9, 10, and 11 show details of the initial air valves.

Fig. 12 is a side view of the hood at the final delivery end of a distributing duct.

Fig. 13 is a horizontal cross section of the same.

Fig. 14 is a top plan view and

Fig. 15 is a transverse vertical section of the hood.

In the drawings the first main element of the apparatus is indicated by A, and the secondary elements, which receive the material from the element A, are shown at B, $B^1$ and $B^2$.

The element or combination of devices indicated as an entirety by A comprises receptacle 1, air supply devices 2, and a mixing and carrying duct 3; and with these there is combined a hopper 4 and a chamber intermediate of the hopper and of the receptacle 1. At the bottom of the latter there is an orifice $4^a$ provided with a valve, cut-off or closing device 5.

The receptacle 1, considered as an entirety, comprises, by preference, a laterally enlarged portion 6 (wherein a relatively large mass of material can be placed) and a converging passageway or sub-chamber 7, the walls of which approach each other downwardly. The entire passage or pathway for the material below the orifice at 8 is free of projections or bodies presenting sharp angles adapted to stop or catch the material. An important purpose is to allow the material to be expelled, immediately after water is introduced, from the chamber in the parts 6 and 7 so that no small submasses of the main concrete mass can be arrested or collected at any point in the path. However, as will be shown below, it is frequently desirable that the material should be compelled to pass through a more or less obstructed passageway to rapidly effect a perfect mixing, but such passageway to be, as aforesaid, without impeding projections.

The "concrete" to which reference is here made is the now well known material composed of broken rock pieces, cement, sand and water. These are placed, miscellaneously, so to speak, in the receptacle 6, 7, preferably by being first thrown into the hopper 4, and then passed immediately therefrom to the lower chamber upon the opening of the valve, damper or cut-off device at 5. In other words, in ordinary practice a "charge" of the volume of say one-half or one-fourth of a cubic yard of the initially separate and unmixed ingredients is placed in the hopper 4 at first resting upon the cut-off 5. Upon the opening of the latter the unmixed materials are quickly dropped into the chamber 6, 7.

The air supply system, indicated as a whole by 2, comprises the main 9 from which are led off the two ducts 10 and 11. The former communicates with the chamber above referred to at points below the orifice 4ª. The duct or pipe 11 is carried down to a point near the receiving end of the duct or passageway 3. 12 is a curved element in the duct, of the nature of an elbow, which registers with the delivery orifice at the lower end of the tapered chamber 7 and is suitably connected to the main duct 3. The delivery end part 13 of the air pipe 11 and the orifice 14 through which the air escapes are preferably so situated that the air shall have a tendency to draw the solid material down from the chamber 6, 7 and the curved duct element 12, and simultaneously propel it on through the duct 3. The best results I have attained by arranging this orifice 14 so that the air enters somewhat tangentially in relation to the path of the material as it moves from the receptacle to the duct 3, and placing it as near as practicable to the orifice 8 through which the materials pass from the chamber 6, 7.

The upper air pipe 10 delivers air in a relatively large body, under pressure, to the space above the "charge" in the chamber 6, 7.

But the air is admitted from duct 11 through the orifice at 14 in a different manner. I have devised a velocity nozzle 16. It is inserted into and secured to the metal of the part 12. It can be made by properly shaping a pipe having threads at 17 to engage with the duct 12, and at 18 to receive the pipe 13.

This nozzle is shaped to bring the air duct down to a reduced throat at 19 and so as to provide an expanding orifice at 14. A number of very important ends are attained by an air-delivery device of this sort. It converts the pressure of the air which is delivered along the pipe sections 11 and 13 into a high velocity, the action of the air upon the material in front of the inward projected jets being such that the material is impelled by velocity rather than by pressure. As a result of the flaring of the orifice at 14 these jets of air issuing under high velocity tend to spread out until their lines intersect at all points the planes of transverse section of the duct or passageway 3.

Heretofore difficulty has been experienced in attempting to mix and handle concrete by pneumatic devices of this general class because of the difference in specific gravities of the various component materials, and a liability to have the solid ingredients separated from or blown from the water. With a mechanism such as I have devised, I have obviated these difficulties, as all of the component ingredients are propelled together in the proper way to first attain and then maintain a perfect mixing.

The pressure of the air delivered at the top of the receptacle, through the pipe 10, is comparatively high and acts as a pneumatic plunger to force the material downward, under this high pressure, toward the receiving end of the duct 3. At the same time, as above explained, the velocity produced at the nozzle 14 is also very high and I have found that this velocity seriously interferes with the proper delivering or depositing of the material directly at the places of delivery. For this reason I have provided the supplementary or secondary devices which will be described.

The secondary part of the present method of treatment, and the subsidiary devices which are used for carrying it out are as aforesaid, indicated as entireties by B, B¹, and B².

Let it be supposed that a building is being erected, either composed entirely of concrete, or of such design as to require, at times at least, large volumes of mixed concrete at different places throughout the structure. Heretofore I have done this work by taking each charge along a path (mixing the component ingredients in transit) extending from the place of intially receiving the unmixed ingredients (such as the chamber at 6, 7) to the point of final deposit, that is, the point where the concrete is to be ultimately laid and set. But I have found from extensive experience that disadvantages are incident to this method, resulting from the high velocity which is necessarily imparted to the materials when the initial pneumatic impulse is given to them. It is difficult to control the delivery to the molds or forms at the places of final deposit, and to regulate the sub-quantities that are required at each of said places. At the same time it must be remembered that the delivery at the ultimate places of deposit must be accomplished in an exceedingly brief period of time; from five to seven minutes being the maximum and my purpose being to deliver it there in from one to three minutes after the water first contacts with the crystallizable ingredients at the initial receiver 6, 7.

Again, in my earlier practice the "charges" were successively and intermittingly carried through as entireties from the initial points to the places of final deposit. I now attain superior results by finally delivering the material in substantially continuous and regulated streams, or sub-streams, though still retaining intermitting mixing of the charges as the initial step in the process with the advantages incident to mixing in that way.

The mixing and conveying duct or passage 3 at its discharge end is adapted to communicate with either of a set of secondary ducts 20, 21, 22, by means of a valve or deflector at 23 of any suitable sort. As each of these sub-systems of treatment of distribution by the parts at B, B¹ and B² is substantially similar to the others, description of one will be sufficient. The duct 20 is conducted in one direction, that at 21 in another, and that at 22 in a third, and so on to any extent desired.

The duct 20 is extended to a receptacle 24 having, preferably, a hopper 27 situated at such place that the operators can, therefrom, readily reach any of many points in a given region. And, likewise, the receptacles for the ducts 21 and 22 are similarly situated in respect to other regions of work.

The receptacle at 24 communicates with a delivery duct 25 which extends to a working place where concrete is to be deposited.

26 is an air pipe extending from the main reservoir or a suitable source of supply, and delivers air in such way that the material delivered to and passing from the receptacle 24 is propelled onward through the duct 25. Any suitable form of receptacle, air delivery device and duct can be employed for carrying out this part of the work. I prefer at present an apparatus such as shown in Fig. 7. Below the hopper 27 there is a seat 28 for a controller here shown as a large conical valve or damper 29 mounted in a correspondingly conical chamber 30 in the seat 28. The controller or valve has a passageway 31 so formed that its orifice at 33 registers with the receiving end 34 of the duct 25, and its orifice 32 can register with more or less of the escape orifice 35 below the receptacle 27. The controller or valve 29 has an extension 36 provided with a handle 37 by which the operator at any time can rotate it so as to open more or less widely the orifice 35 and permit a greater or less quantity of the material to pass toward the duct 25. This extension 36 is central, axially, with the valve 29, and through it passes the velocity nozzle or delivery section 38 of the air duct 26. This nozzle is also so formed that the pressure of the air which reaches it through the duct 26 is converted into relatively high velocity. The passage in the nozzle is reduced to provide a throatway of small diameter at 39 and beyond this is formed a flaring nozzle 40. The action of the air jets here is similar to that above set forth when describing the nozzle 16 with its orifice 14.

The manner in which these devices are operated will be readily understood. If the valve or director at 23 is set for delivery to the pipe 20, the next mixed "charge" of concrete impelled from the initial apparatus at 6, 7, 12, 13 will, in two or three seconds from the time of the application of the pneumatic impulse, be forced outward and upward into the receptacle at 24, the quantity being, say, from one-fourth to one-half of a cubic yard, and this quantity being suddenly deposited therein. If desired, two, three or more such "charges" can be delivered to this receptacle 24, the total quantity (two, three or more charges) being mixed and carried to this place in from half a minute to a minute. But as that is too rapid a delivery for the proper manipulating of the concrete in the forms or molds, (although such speed may be required for the proper mixing of the material) the supply thereof to receptacle 24 is stopped for a minute or two, and the other receptacles 24ª and 24ᵇ of the system have mixed "charges" delivered to them. At the same time, the operator at the receptacle 24 is, by means of the air jets at 40, causing the flow of a substantially continuous stream from his receptacle to the place of deposit on the wall, in the form, mold or the like. If it is necessary for him, for a few seconds, to cut off his stream, he does it by means of the rotary controller or valve 29, or he can maintain a continuity of the stream with variations in quantity, as he sees fit.

At the forms or molds I provide for the pipes 25, checks as indicated at 41. Each of these consists of a hood-like device having a chamber 42 which receives the stream of material and the air jets. The air on reaching this chamber separates from the other materials and escapes upward through apertures or orifices at 43 in the chamber walls. The concrete mixture settles downward, and to break its fall baffle-plates 44, 45 are employed. With these I succeed in delivering the concrete mass gently and in such way as to avoid the splashing and irregular delivery that have been a cause of difficulty heretofore.

There are numerous details included in the apparatus above described from which one can depart and yet retain the advantageous features of the invention. For example, instead of the swinging valve or cut-off 5 which closes and opens the initial orifice 8, use may be made of a rotary valve such as I have shown in other applications for patent. A swinging cut-off or valve, however, of the form here shown is easily and quickly handled and is susceptible of providing a tight joint with less expensive parts.

At 46 there is shown a pneumatic apparatus for holding and opening cut-off 5. It comprises a cylinder 47 hinged at 48, and a piston rod 49 pivotally connected to a crank 50 which is rigid with a shaft 51 that passes through the receiver casing and carries a crank arm 52 adapted to bear against the valve or cut-off 5. 56 is an air pipe connected by a pipe section or hose 57 with the cylinder 47, there being a three-way valve at 58 for controlling the passageway. When the valve at 58 is in one position, air is admitted to the end of the cylinder 47, and the pressure which it exercises upon the piston 59 moves the latter in such way as to close the cut-off 5 and hold it closed, until the valve 58 is turned to its second position which cuts off the air at the end of the pipe section 56 and permits the escape of the air from the cylinder 47. Thereupon the pressure of the "charge" on the cut-off 5 rocks the crank arm 50 and pulls the piston in cylinder 47 until the cut-off is open.

The air passing through the pipes 10 and 11 may be controlled by separate valves, one in each of said pipes, and arranged to be independently thrown. Or two such independent valves can be connected together so that they will be moved simultaneously. I prefer, however, to employ a duplex valve structure such as shown at 60. It consists of a casing part 61 with a tapering interior chamber and a conical rotatable valve part 62 adjustably held therein by means of a nut and screw at 63. Two ports or valveways 64, 65 are provided, and in line therewith are threaded bosses adapted to receive the ends of the air pipes 10 and 11 on one side, and air feed pipes 10ª and 11ª on the other. 66 is the handle of the valve. By turning it in the proper direction the pressure mass of air and the velocity mass can be introduced, one to the upper part of the receptacle 6, 7, and the other to the orifice at 14. For some work it is desirable to have the air admitted to the latter place, the orifice 14, slightly in advance of the full exertion of pressure at the top of the mass, and in such case the ports 64 and 65 can be suitably arranged, not precisely parallel to each other but so that the one at 65 shall register with its ducts somewhat ahead of the one at 64. The ends of the port 65 reach the opposing ports in the casing 61 somewhat sooner than do the ends of port 64 and consequently the velocity jets at 14 commence to act before the full pressure of air is exerted on the top of the material and all tendency of the material to choke or clog in the partially obstructed passageway at 12 is overcome.

The valve, or downwardly swinging bottom 5 of the hopper 4, is arranged so that it quickly drops when it is desired to deliver a charge from the hopper into the receptacle. The part at one side of the axis upon which the charges of material rest is not balanced by weight or otherwise on the other side of the axis, and the gravity of the valve, itself, and of the charge are, therefore, ready to instantly cause the dropping of the valve when the escape orifice for the air duct from the cylinder 47 is opened. The valve is moved in only one direction by the application of force to it from the pneumatic motor, but for movement in the other direction, the valve is practically entirely free. And this arrangement of a non-balanced valve and a power device acting upon it in only one direction enables me to deliver the charges rapidly. The pneumatic motor is actuated independently of the air which is admitted to the interior of the receptacle, and, therefore, it can be utilized not only to forcibly close the valve, but also to hold it in position against the weight of the charge.
The valve 5 is mounted in the intermediate chamber between the hopper and the receptacle 1, and the dimensions of the parts are such that the charge from the hopper will pass through the intermediate chamber and lie, practically all, in the receptacle 1. Consequently, the valve can suddenly swing freely downward to a vertical position to deliver the charge which it supports.

What I claim is:
1. The method herein described of preparing concrete and delivering it to the places of final deposit, it consisting in forming charges of predetermined proportioned quantities of the component ingredients of concrete in an unmixed condition, causing the said charges successively to pass under the action of intermitting air blasts through a prolonged mixing path, arresting the travel of the said charges at the terminus of the said path, and then advancing, by supplemental air blasts, the mixed concrete material from the place of arrest to the places of final deposit, substantially as set forth.
2. The method herein described of preparing concrete and delivering it to the places of final deposit, it consisting in forming successive charges of predetermined proportioned quantities of the component ingredients of concrete in an unmixed condition, causing the said charges successively to pass under the action of intermitting air blasts through a prolonged mixing path, arresting the travel of the said charges of mixed concrete and forming a temporarily stationary mass thereof at the terminus, and then forming a continuous stream thereof and impelling it under a continuous air blast to the points of final deposit, substantially as set forth.

3. The method herein described of preparing concrete, delivering it to the places of final deposit, it consisting in forming successive charges of predetermined proportioned quantities of the component ingredients of the concrete in an unmixed condition, causing the said charges successively to pass, under the action of intermitting air blasts, through a prolonged mixing path, arresting the travel of the said charges of mixed concrete at each of a series of places of primary delivery successively, and forming at each of said places a temporarily stationary mass and then forming a series of continuous streams from the said masses respectively, and impelling them under continuously acting air blasts to the points of final deposit, substantially as set forth.

4. The method herein described for treating and delivering concrete, it consisting in supplying masses of the concrete materials to, and, by relatively powerful air blasts, driving them through the initial part of a prolonged duct, arresting the concrete masses at points intermediate the extremities of their total path and advancing them through the terminal parts of the said path by volumes of air of relatively lower pressure, substantially as set forth.

5. The method herein described of treating and delivering concrete to the places of its final deposit, it consisting in forming masses of concrete and propelling them at a relatively high speed under the action of air blasts along the first part of the path of travel to the said places of deposit, then causing them to travel with relatively slower speed under the action of air blasts supplemental to those aforesaid, substantially as set forth.

6. The method herein described for treating and delivering concrete, it consisting in intermittingly supplying masses of the concrete materials to a relatively prolonged path and driving them at a relatively high speed by air blasts through the initial part of said path, arresting the concrete masses at points in the said path and then advancing them in continuous streams through a secondary part of the said path at relatively slower speeds by air jets supplemental to those aforesaid, substantially as set forth.

7. The method herein described for preparing concrete and delivering it to the places of final deposit, it consisting in forming successive charges of predetermined proportioned quantities of the component ingredients of the concrete in an unmixed condition at the initial end of a mixing path, causing the said charges to pass under the action of intermitting air blasts along the said mixing path and causing the component ingredients to be mixed while traveling along said path to form concrete at a relatively high speed, then forming a series of streams of the mixed concrete and causing them to travel at a relatively slower speed to the places of deposit, substantially as set forth.

8. The herein described method of treating and delivering concrete, it consisting in forming charges of predetermined proportioned quantities of the component ingredients of concrete in an unmixed condition, delivering the charges successively to a prolonged mixing path, supplying air jets on longitudinal lines of the said path and causing them to intersect the transverse planes of said path at substantially all points of said planes, substantially as set forth.

9. In an apparatus for treating concrete materials and supplying the concrete at the points of final deposit, the combination of a receptacle for receiving initially the component ingredients, a relatively prolonged duct through which the said ingredients are propelled, means for supplying jets of air to the said material to propel it through the said duct, a receptacle into which the material is carried from the said duct, the said receptacle being relatively large in cross sectional area as compared with the duct, a second duct extending from the last said receptacle toward a place of deposit, a second set of devices for supplying an air blast supplemental to that aforesaid for engaging the material in the second duct to convey it from the said second receptacle through the said duct, substantially as set forth.

10. In an apparatus for treating concrete materials and supplying the concrete at the points of final deposit, the combination of the initial receptacle for receiving the component ingredients of a mass of concrete, a relatively prolonged duct communicating therewith, means for supplying air jets to the said duct to force the material therethrough, a second receptacle arranged to receive the material from the said duct, a second duct for carrying the material from the said second receptacle, means for supplying jets of air thereto supplemental to the first aforesaid air supplying means, and means for controlling the passage of the material from the second receptacle to the second duct, substantially as set forth.

11. The combination of the initial receptacle, the duct communicating therewith, the series of secondary ducts, each adapted to communicate with the first aforesaid duct, means for controlling the communication of the first said duct with each duct of the said series, means for receiving the material from each of the ducts of the said series and conducting it to places of supply, and means for controlling the speed and quantity of the material which moves through the last said devices, substantially as set forth.

12. In a concrete mixing and delivering apparatus, the combination with the initial receiving and mixing duct, of the secondary delivery duct, the intermediate receptacle communicating with the secondary duct and with which the initial duct communicates, and means for controlling the passage of the material from the initial duct through the receptacle of the secondary duct, substantially as set forth.

13. In a mechanism for preparing and delivering concrete, the combination of the primary mixing duct, the secondary delivery duct, the receptacle intermediate of the said ducts, the air supply mechanism communicating with the secondary duct, the means for controlling the passage of the material from the primary duct to the secondary duct, the receptacle for the initial ingredients of the concrete communicating with the primary duct, and the air supply mechanism for delivering air jets to the primary mixing duct, substantially as set forth.

14. The combination of the primary mixing duct having an initial receiving part, and a series of diverging parts adapted to communicate with the initial part, means for controlling the communication between the initial part and the diverging part of said duct, the series of receptacles with which the said diverging parts of the initial ducts communicate, respectively, and the series of secondary or delivery ducts communicating with the receptacles of the said series, substantially as set forth.

15. In an apparatus for preparing and delivering concrete, the combination of a receptacle adapted to receive the component ingredients of a concrete mass or charge, a mixing duct communicating with said receptacle, means for delivering air to the said mixing duct having a contracted throat in the air passage and an expanded mouth or nozzle between said contracted throat and the mixing duct, substantially as set forth.

16. In a mechanism for preparing and delivering concrete, the combination of a receptacle for receiving the initial component ingredients of the concrete mass, a mixing and conveying duct communicating with said receptacle, means for supplying a stream of air to the path of the material in the said duct, said means having a contracted throatway in the path of the air, and a flared or expanding nozzle adapted to deliver diverging air jets under velocity, and means for supplying air in volume under pressure above the mass of material in the receptacle, substantially as set forth.

17. In a mechanism for preparing and delivering concrete, the combination of a receptacle for receiving the initial component ingredients of the concrete mass, a mixing and conveying duct communicating with the said receptacle, means for supplying a stream of air to the path of material in the said duct, means for supplying air to the receptacle above the mass of material therein, and a common controlling device whereby air under pressure can be introduced to both of the said air supplying means substantially simultaneously at the will of the operator.

18. In a mechanism for preparing and delivering concrete, the combination of a receptacle for receiving the initial component ingredients of the concrete mass, a mixing and conveying duct communicating with the said receptacle, means for supplying a stream of air to the path of material in the said duct, means for supplying air to the receptacle above the mass of material therein, and a single valve having two orifices whereby air under pressure can be introduced to both of the said air supplying means substantially simultaneously at the will of the operator.

19. In a mechanism for preparing and delivering concrete, the combination of a receptacle for receiving the initial component ingredients of the concrete mass, a mixing and conveying duct with the said receptacle, means for supplying a stream of air to the path of material in the said duct, means for supplying air to the receptacle above the mass of material therein, and a valve mechanism whereby air under pressure can be introduced to both of said air supplying means and can be introduced to the first air supplying means slightly in advance of the time at which it is introduced to the second air supplying means.

20. In a mechanism for preparing and delivering concrete, the combination of a receptacle for receiving the initial component ingredients of the concrete mass, a mixing and conveying duct communicating with the said receptacle, means for supplying a stream of air to the path of material in the said duct, means for supplying air to the receptacle above the mass of material therein, and a plug valve having two non-parallel apertures whereby air under pressure can be introduced to the first said air supplying means slightly in advance of the second said air supplying means.

21. In a mechanism for conveying concrete, the combination of a hopper for the material to be conveyed having a discharge opening in its bottom, a duct leading to the place of deposit, a plug valve interposed between the said hopper and said duct and rotatable along an axis extending longitudinally of the duct, the said valve having an aperture registering at one end with the duct and adapted at its other end to be brought into or out of register with the discharge opening in the hopper, and means combined with the valve for introducing air under pressure into the duct to force the concrete materials therealong.

22. In a mechanism for conveying concrete, the combination of a hopper for the material to be conveyed having a discharge opening in its bottom, a duct leading to the place of deposit, a plug valve interposed between the said hopper and said duct and rotatable along an axis extending longitudinally of the duct, the said valve having an aperture registering at one end with the duct and adapted at its other end to be brought into or out of register with the discharge opening of the hopper, and a nozzle for introducing a jet of air into the said valve aperture longitudinally of the duct.

In testimony whereof I affix my signature, in presence of two witnesses.

JOHN H. MacMICHAEL.

Witnesses:
 GEO. GILLETTE,
 B. F. LINDSAY.